(No Model.)

H. P. WELLS.
CARRIAGE.

No. 516,321. Patented Mar. 13, 1894.

Witnesses:
Walter E. Lombard.
Walter Bachelder

Inventor:
Harlan P. Wells
by T. W. Porter Atty.

UNITED STATES PATENT OFFICE.

HARLAN P. WELLS, OF AMESBURY, MASSACHUSETTS, ASSIGNOR OF ONE-HALF TO OSGOOD MORRILL, OF SAME PLACE.

CARRIAGE.

SPECIFICATION forming part of Letters Patent No. 516,321, dated March 13, 1894.

Application filed December 30, 1893. Serial No. 495,181. (No model.)

*To all whom it may concern:*

Be it known that I, HARLAN P. WELLS, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
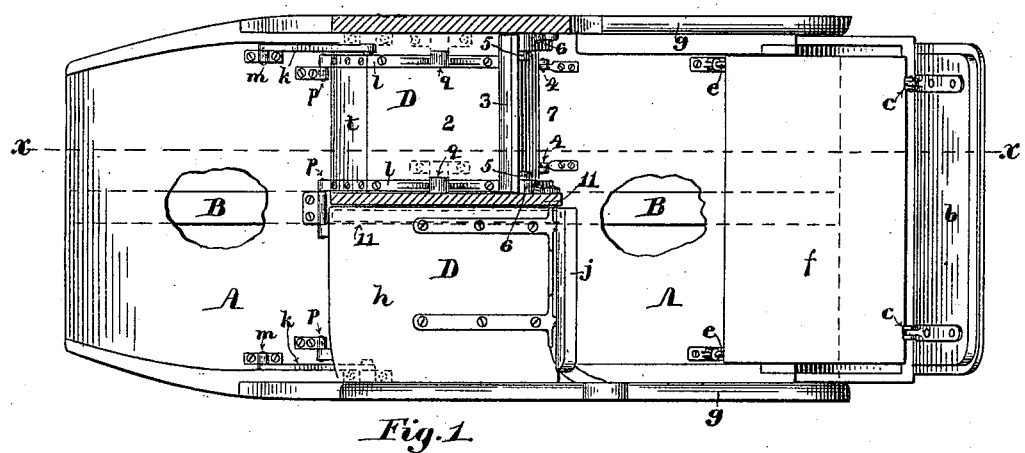
Figure 2:
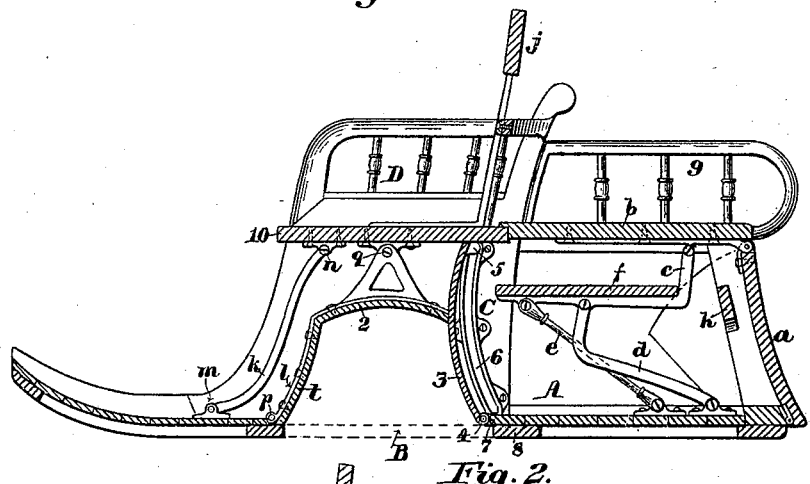
Figure 3:
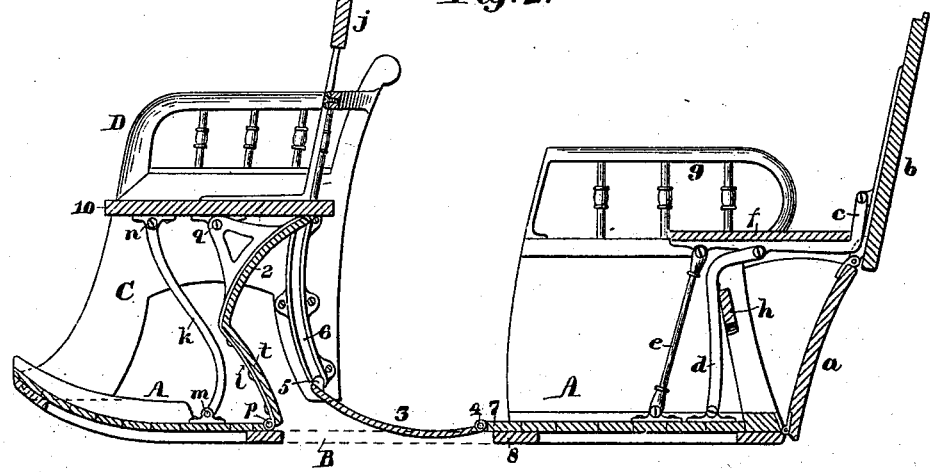

In said drawings, Figure 1, is a sectional top plan view of the carriage body, the rear seat and the left hand front seat being in position for use, and the right hand front seat being cut away by a horizontal section line that passes between the top of the wheelhouse and the bottom of said seat. Fig. 2, is a vertical longitudinal elevation, the section being taken between the longitudinal center and the right hand side of the body as at X, and the view being as from the left hand side of said body, with the rear seat turned down, and with the two halves of the front seat in place for use. Fig. 3, is a view like Fig. 2, but with the rear seat in position for use and with the two halves of the front seat jumped forward as when entering or leaving the rear seat.

This invention relates to carriages in which are arranged a front seat and a rear seat, and in which the front seat can be moved or jumped forward, and to which front seat the whole or a part of the wheelhouse is secured, so as to move with said seat. And the invention consists in so arranging and constructing said parts that when the front seat is moved forward, to create space between it and the rear seat to allow a passage between them, a portion of the carriage will be arranged to cover the space that at other times constitutes the wheelhouse; so that when the front seat is thus moved forward, the person entering or leaving the rear seat, will have said otherwise open space filled by a tread and can step thereon to facilitate entering or leaving the carriage as will be now more particularly described.

Referring again to said drawings, A, represents the carriage body, which is provided with a hinged tailboard $a$ that can be opened and closed, and to which is hinged the board $b$, that when opened serves as the back of the rear seat, and when closed serves as a deck panel as shown in Fig. 2. Said part $b$ is hinged above its lower edge to iron $c$ that is secured to the under side of rear seat $f$ that jumps back on irons $d$, $e$, to serve as the rear seat, and forward when it is lowered into the body. The bar $h$ that extends from side to side of body A serves to hold the seat in place when open, as is shown in Fig. 3. This rear seat is not part of my present invention, except that some kind of a rear seat should be shown. And said seat has been patented to Harlan P. Wells, August 9, 1892, No. 480,307, and to Osgood Morrill and Harlan P. Wells, February 28, 1893, No. 492,414. The front seat is shown at D as a whole, and the part C of the sides of body A are secured to said seat in substantially the manner shown in United States Patent No. 471,157, granted to Harlan P. Wells and Osgood Morrill March 22, 1892. So that when seat D is moved back and forth said sides move with the seat, being a part thereof; though when in their rearward position they constitute a part and parcel of the body A. Said front seat is connected with body A by the front iron K and the rear iron $l$, said front iron being at its respective ends pivoted at $m$, $n$, and iron $l$ being pivoted at $p$ and $q$. Said rear iron is secured to the front $t$ and top 2 of the wheelhouse, so that said parts move with iron $l$ as shown. The rear wall of the wheelhouse is shown at 3, and is at its lower edge pivoted to floor 7 of the body, or it may be pivoted to sill 8, if preferred. Said part 3, extends up to the under side of bottom 10 of the front seat, and near its top it has a knob 5 that enters groove 6, of part C of the front seat, so that when said seat is moved forward as shown in Fig. 3, the movement of the seat forward will lower part 3 to the position shown in Fig. 3, so that it fills practically the wheelhouse space and serves as a tread or step for the occupants of the rear seat. The fixed connection between the front and rear portions of the body is the central sill B, which passes along at the level of the floor as shown in Fig. 1, and which is duly ironed to give it the required strength. At the inner or meeting ends of the two halves of the front seat, they have each a separate partition 11, that is securely fastened to the respective halves of the front seat, and which rest on the central sill B, when the seat is in position for use as a seat. It is thus apparent that when front seat D is in position for use, as shown in Figs. 1 and 2, that a perfect wheelhouse is formed by walls t, 2 and 3, into which the wheel can enter to facilitate turning the vehicle, and that when said seat is moved forward, then part 3, furnishes a tread that fills the wheelhouse space, and facilitates the passing to and from the rear seat.

Being, as I believe, the first to provide a cut under carriage, having a wheelhouse that is moved with the movement of the front seat, with a movable tread or step that when the wheelhouse is moved will be in the wheelhouse space, I desire to describe the different modes in which such step or tread may be arranged.

Instead of its being part 3 of the wheelhouse it may be either part t or part 2 that will be moved into position as such tread. Or the partitions 11, may be arranged to swing outward upon a pivot at their bottom edge, to serve as such tread; or a piece may be arranged above or below floor 7 to be moved into position to serve as such tread. Either of these methods of supplying a tread, in place of part 3, involves only the requisite change in details as will be at once apparent.

It will be obvious that the front seat is divided in the longitudinal line of the body, so that either half thereof can be raised or lowered without disturbance of the other half, and that each half is provided with jumping irons for such purpose, and that the wheelhouse of each half is independent of the other half. But that if preferred the front seat may be formed as an entire whole with my present improvements thereto applied.

Having thus described my invention, what I claim as new, and desire to secure by Letters Patent, is—

1. In a carriage formed with a front seat arranged to be moved forward, and to thereby move the wheelhouse, a portion of said carriage constructed and arranged to move into the wheelhouse space to serve as a tread or step for those entering or leaving the rear seat, substantially as specified.

2. In a carriage of the class or kind described, the wall of the wheelhouse arranged to be raised and lowered by the movement of the front seat, and to serve when lowered as a tread for those entering or leaving the rear seat, substantially as specified.

3. In a wheelhouse carriage the combination of front seat D, the grooved piece secured to side C, the rear wall 3 of the wheelhouse hinged at its lower edge and provided with a knob to travel in said groove, whereby said part 3 is raised and lowered substantially as specified.

HARLAN P. WELLS.

Witnesses:
G. H. BRIGGS,
DELL W. DOLBIER.